US012581336B2

(12) United States Patent
Vikram et al.

(10) Patent No.: US 12,581,336 B2
(45) Date of Patent: Mar. 17, 2026

(54) PREDICTION OF CELL TRAFFIC IN A NETWORK

(71) Applicant: Telefonaktiebolaget LM Ericsson (publ), Stockholm (SE)

(72) Inventors: Akshat Vikram, Bengaluru (IN); Arpit Sisodia, Noida Uttar Pradesh (IN); Harshit Tated, Bangalore (IN); Ranjani H G, Bangalore Karnataka (IN); Sree Kanth Reddy Yerraguntla, Bangalore (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 308 days.

(21) Appl. No.: 18/549,988

(22) PCT Filed: Mar. 16, 2021

(86) PCT No.: PCT/IN2021/050268
§ 371 (c)(1),
(2) Date: Sep. 11, 2023

(87) PCT Pub. No.: WO2022/195600
PCT Pub. Date: Sep. 22, 2022

(65) Prior Publication Data
US 2024/0172016 A1 May 23, 2024

(51) Int. Cl.
*H04W 24/08* (2009.01)
*H04W 24/02* (2009.01)
(52) U.S. Cl.
CPC .......... *H04W 24/08* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 8,671,189 B2 | 3/2014 | Cho et al. | |
| 8,694,018 B2 | 4/2014 | Budic et al. | |
| 10,148,577 B2 | 12/2018 | Guichard et al. | |
| 10,250,508 B2 | 4/2019 | Tao et al. | |
| 10,841,853 B1 | 11/2020 | Yousefi'zadeh et al. | |
| 2019/0036789 A1* | 1/2019 | Kaplunov ........ | G06Q 10/06393 |

FOREIGN PATENT DOCUMENTS

EP      1326374 B1      7/2003

OTHER PUBLICATIONS

International Search Report and Written Opinion dated May 6, 2021 for International Application No. PCT/IN2021/050268 filed Mar. 16, 2021; consisting of 7 pages.

* cited by examiner

*Primary Examiner* — Fadi Haj Said
(74) *Attorney, Agent, or Firm* — Weisberg I.P. Law, P.A.

(57) ABSTRACT

According to one or more embodiments, a node for a communication network is provided. The node includes processing circuitry configured to determine a plurality of key performance indicators, KPIs, for a plurality of cells in the communication network, predict a trend of values for each of the plurality of KPIs, the predicted trend of values indicating at least one predicted network attribute, and perform at least one action based at least in part on the at least one predicted network attribute.

23 Claims, 10 Drawing Sheets

10

26

30

12

16a

18a

Node 15    Prediction Unit 32    14

24

28

20

16c

22a 22b    18c

18b

16b

PREDICTION OF CELL TRAFFIC IN A NETWORK

CROSS-REFERENCE TO RELATED APPLICATION

This application is a Submission Under 35 U.S.C. § 371 for U.S. National Stage Patent Application of International Application Number: PCT/IN2021/050268, filed Mar. 16, 2021 entitled "PREDICTION OF CELL TRAFFIC IN A NETWORK," the entirety of which is incorporated herein by reference.

TECHNICAL FIELD

Wireless communication and in particular, to proactively predicting at least one network trend to trigger one or more actions.

BACKGROUND

Mobile (wireless device) data traffic has been increasing at a rapid pace due to, for example, the popular use of both smartphones and tablets, which are types of wireless devices. Further, the demand for high bandwidth and capability for mobility in wireless devices has increased. This increase is expected to continue in the future such that network operators may be required to find new efficient uses of limited radio resources in order to meet demand.

Wireless device data usage patterns tend to vary with time. This coupled with movement of the wireless device, results in time varying and unbalanced networks. Due to such nature of mobile communications, the traffic load is often not equal throughout a cellular network. Unequal load scenarios can be observed in certain cells (referred to as victim cells) vis-à-vis its neighbor cells.

Consequently, a large portion of network/communication traffic may be concentrated on a certain cell (referred to as a hotspot cell) where the traffic load on adjacent cells is often low and their resources are often not fully utilized. This situation is dynamic. To help accommodate the imbalance in the traffic, load balancing (LB) between network nodes may be performed.

Load Balancing is a mechanism of transferring load from an overloaded cell to at least one neighboring cell with free or unused resource, thereby providing a more balanced load distribution in order to maintain/enhance appropriate end-user experience and network performance.

The load of a cell in the cellular network is measured is terms of usage of different resources with respect to their available limits:

Usage of a cell—physical resource block, PRB, utilization, transmit power, congestion, etc.
Interference in a cell—Uplink Received Signal Strength indicator (UL RSSI).
Cell throughput in uplink and downlink.
Handover failure rate.

Some existing cellular systems require manual configuration and management of networks, which is costly, time consuming and error prone due to exponentially increasing rate of wireless devices and nodes. However, some capabilities for network management have minimum human involvement, i.e., manual configuration.

Example Modes of Load Balancing:
Active Mode Load Balancing: Active load balancing allows active mode wireless devices to be load balanced across cells to lower the overall congestion across cells.

Idle Mode Load Balancing: Idle mode load balancing is more difficult to achieve than Active Mode Load Balancing since a network node cannot detect the idle mode wireless device such that the network node becomes aware of a wireless device only when it becomes active or when the tracking area of the wireless device changes and a Tracking Area Update (TAU) message is sent by the wireless device.

Cell Reselection: System parameters that control cell reselection and the network operator's channel frequency preferences are transmitted to wireless devices in the System Information Blocks (SIBs).

In active mode load balancing, the conventional techniques to redistribute traffic in-order to balance load of victim cells is affected by antenna down tilting or adjusting network node coverage. Alternately, to improve QoS for dynamic loads of victim cells, there exists budget reliant approaches such as acquiring spectrum, adding new cells, etc. Both these approaches are time consuming, require physical changes and are reactive to the changes in traffic. However, the congestion in victim cells continues to impact the speed of existing connections or can result in dropping calls in case of dynamic environments.

Further, to balance the load in the network, the concept of self-organizing networks (SON) was introduced, where the parameter tuning is performed automatically based on measurements.

SON algorithms may include:
Load balancing: to offload excess traffic to low-loaded adjacent cells.
Handover parameter optimization: to reduce handover (HO) problems such as radio link failures, handover failures or ping-pong handovers.
Pilot power modification.
Antenna tilt.
Handover (HO) parameter modification.
Other Load Balancing Techniques.
Inter frequency Load balancing.
Layer management strategy.

However, all these existing load management techniques are either reactive or occurring in real-time, both of which still negatively impact performance as the issue (e.g., network congestion) continues to persist at, for example, a victim cell. For example, shortcomings of existing load management techniques include one or more of the following:
Machine learning (ML) models are not very prevalent;
Prediction models are used at the cell level. This, in turn, causes issues of model scalability and maintainability where there exist ~100K cells.
Handover changes are dependent on optimization criteria, thus increasing the time required for actuation of HO. This makes it difficult for real-time deployment.
Utilization of ML for identifying and recommending the target cell—this approach is not proactive in identifying victim cells.
Cells are largely considered independent of one another for analysis purposes.

SUMMARY

Some embodiments advantageously provide a method and system for proactively predicting at least one network trend to trigger one or more actions.

For example, one or more embodiments described herein relate to a proactive approach to balance the traffic load in a cellular network using Machine learning. The methods and approaches described herein involve predicting the cell traffic.

To facilitate full utilization of available network capacity & spectrum resources, proactive load balancing is considered for cellular traffic via machine learning as described herein.

Based on problems with existing solution, one or more embodiments described herein provide for continuous prediction of cell traffic in advance (based on various input parameters) and for corrective action(s) to be performed or triggered when predicted probability of traffic is high or a predefined threshold or predefined criterion is met.

In one or more embodiments, the following steps are performed:

1. A ML model is trained to predict cell traffic in advance.
2. Input features/parameters considered for the ML model
   a. Spatio-temporal features are derived from key performance indicators (KPIs)
      i. Temporal features
         1. Uses historical data of at least 2 days.
         2. Periodicity utilized as part of input features.
         3. Fourier transform coefficients of KPIs.
      ii. Spatial features
         1. Features aggregated from ranked neighbors.
      iii. Some example KPI related features

```
kpi__16QAM__Samples_percentage
kpi__256QAM__Samples_percentage
kpi__64QAM__Samples_percentage
kpi__BLER__DL
kpi__Bad__Coverage__Evaluation__Samples
kpi__PDCCH__CCE__Utilization
kpi__QPSK__Samples_percentage
kpi__Rank2SamplesPercentage
kpi__UL__RSSI__PUCCH
kpi__UL__RSSI__PUSCH
kpi__connectedusers
kpi__cqi
kpi__dl__latency
kpi__dl__packeterrorloss
kpi__dl__packeterrorloss
kpi__dlthroughputuser
kpi__dlthroughputuser
kpi__mimo__util__cal
kpi__pdcch__util__cal
kpi__pdcp__traffic__volume
kpi__pmRadioTbsPwrRestricted
kpi__prb__util__calc
kpi__prb__util__calc
kpi__pucch__util__cal
kpi__pusch__util__cal
kpi__ul__rssi
``` b. Additional features
      iv. Hour of prediction.
      v. Weekday of prediction.
      vi. Presence/absence of Massive Multiple Input Multiple Output (MIMO).
      vii. Maximum downlink (DL) capacity.
      viii. FDD/TDD type.
3. The ML model output may include/provide at least one of:
   b. Aggregated mean over N ROPs of the target KPI to predict the trends of the signal.
   c. Avoidance of prediction of spurious fluctuations.
4. The system described herein involves one or more of the following characteristics:
   d. Identify cluster based on mixture models.

e. Geographical cluster-specific models to preserve pattern.
   f. Agnostic to introduction/removal of bandwidths, frequencies and cells thus enhancing scalability.
   g. Continuous prediction, for every ROPs.
   h. Can handle missing ROP and missing data.
   i. Configurable classification thresholds for different bands.

In one or more embodiments, a method for effective traffic balancing in cellular network is provided. The cell performance is predicted in advance for all the cells of a geographical circle/area through machine learning models which are trained utilizing the historical Spatio-temporal patterns in cellular traffic. Victim cells are identified using configurable network thresholds. This, in turn, helps mitigate the need for new models for changed network thresholds, i.e., helps mitigate the need to retain the model and/or change parameters for the model. Load from the victim cells may be handed over to target cells (e.g., the neighboring cells of the victim cells with available resources). The network congestion is prevented by proactively predicting cell performance.

Some Differences of One or More Embodiments Described Herein from Existing Systems a. Prediction models such as linear regression, AutoRegressive Integrated Moving Average (ARIMA), Neural Network (NN) may be used at the cell level. This, in turn, causes issues of model scalability and maintainability in where there exist 100K cells. One or more embodiments described herein may have approximately 20 models per 100K cells, thereby reducing the issue with model scalability and maintainability.
   b. One or more embodiments described herein provide for a computationally faster hand-over based on predicted outputs of neighboring cells—This is in direct contrast to slowly converging, computationally expensive solutions such as Genetic Algorithm (GA), Block Coordinated Descent Simulated Annealing (BCDSA) or Constrained Simulated Annealing (CSA).
   c. One or more embodiments described herein uses Spatio-temporal features of all correlated KPIs as opposed to just using historical data of certain KPIs.

Further, while one existing system may use ML only for identifying and recommending the target cell, one or more embodiments described herein use proactive ML based approaches for traffic KPI prediction for all cells.

One or more embodiments provide one or more of the following advantages:

1. Proactively predict network performance.
2. Configurable thresholds for classification of cells as victim and target cells, which helps mitigates the need for new models as thresholds change.
3. Predicting KPIs in advance can help ensure HO before network congestion.
4. Agnostic to number of cells and newly introduced bandwidth such as to allow for less complex scaling.
5. Predicting the network congestion through an aggregated target over multiple Reporting Output Period (ROP) instead of an exact value helps prevents spurious HO and ping-pong effects, thereby providing cost benefits
6. Scalable solutions as ML models are not at the cell level and do not require frequent retraining.
7. The approach can be used for any other KPI prediction problem such that one or more embodiments described herein are not limited to load balancing.

8. HO changes may be dependent only on predicted KPI and no other optimization criteria, thus decreasing the time required for actuation of HO, which increases viability of one or more embodiments for real-time deployment.

According to one aspect of the disclosure of this aspect, a node for a communication network is provided. The node includes processing circuitry configured to determine a plurality of key performance indicators, KPIs, for a plurality of cells in the communication network, predict a trend of values for each of the plurality of KPIs, the predicted trend of values indicating at least one predicted network attribute, and perform at least one action based at least in part on the at least one predicted network attribute.

According to one or more embodiments of this aspect, the at least one action includes at least one of performing handover of at least one wireless device, changing a coverage area of a network node, changing in antenna tilt at the network node and changing a communication power at a cell. According to one or more embodiments of this aspect, the predicted trend of values are predicted in advance by at least four reporting output periods, ROPs, for the plurality of cells. According to one or more embodiments of this aspect, the at least one predicted network attribute indicates at least one of cell accessibility and proactive network and energy utilization.

According to one or more embodiments of this aspect, the predicted trend of values for each KPI of the plurality of KPIs is based at least in part on at least one spatio-temporal characteristic that is derived from the respective one of the plurality of KPIs. According to one or more embodiments of this aspect, the at least one spatio-temporal characteristic includes at least one of historical data, periodicity and Fourier coefficients of the plurality of cells and at least one neighbor cell. According to one or more embodiments of this aspect, the plurality of KPIs include at least one of downlink block error rate, BLER, physical downlink control channel, PDCCH, control channel element, CCE, utilization, modulation sample percentage, uplink received signal strength indication, RSSI, downlink packet error loss, packet data convergence protocol traffic volume, data throughput, physical resource block, PRB, utilization, and network coverage percentage.

According to one or more embodiments of this aspect, the at least one action is configured to one of redistribute at least a portion of a traffic load, increase data throughput, improved quality of service for at least one wireless device, and redistribute at least a portion of communication power. According to one or more embodiments of this aspect, the processing circuitry is further configured to identify a victim cell of the plurality of cells based at least in part on the at least one predicted network attribute meeting a predefined criterion where the at least one action is configured to reduce a probability that at least one network attribute that is predicted at a later time will meet the predefined criterion. According to one or more embodiments of this aspect, the predicted trend of values for each of the plurality of KPIs is based at least in part on a plurality of data streams associated with the plurality of cells.

According to one or more embodiments of this aspect, the processing circuitry is further configured to calculate short-time Fourier Transform, STFT, coefficients based at least in part on the predicted trends of values for each of the plurality of KPIs where the at least one predicted network attribute is based at least in part on the calculated STFT coefficients. According to one or more embodiments of this aspect, the processing circuitry is further configured to logically cluster the plurality of cells into a plurality of cell clusters based at least in part on at least one respective property of each plurality of cells, logically weigh at least one respective property of a respective neighbor of each of the plurality of cells, and apply a joint regression and classification framework based at least on the logical cluster of the plurality of cells and the logical weighing of at least one respective property of the respective neighbor where the at least one action is based at least in part on the applied joint and classification framework.

According to another aspect of the disclosure, a method implemented by a node for a communication network is provided. A plurality of key performance indicators, KPIs, for a plurality of cells in the communication network are determined. A trend of values for each of the plurality of KPIs is predicted where the predicted trend of values indicate at least one predicted network attribute. At least one action is performed based at least in part on the at least one predicted network attribute.

According to one or more embodiments of this aspect, the at least one action includes at least one of performing handover of at least one wireless device, changing a coverage area of a network node, changing in antenna tilt at the network node and changing a communication power at a cell. According to one or more embodiments of this aspect, the predicted trend of values are predicted in advance by at least four reporting output periods, ROPs, for the plurality of cells. According to one or more embodiments of this aspect, the at least one predicted network attribute indicates at least one of cell accessibility and proactive network and energy utilization.

According to one or more embodiments of this aspect, the predicted trend of values for each KPI of the plurality of KPIs is based at least in part on at least one spatio-temporal characteristic that is derived from the respective one of the plurality of KPIs. According to one or more embodiments of this aspect, the at least one spatio-temporal characteristic includes at least one of historical data, periodicity and Fourier coefficients of the plurality of cells and at least one neighbor cell. According to one or more embodiments of this aspect, the plurality of KPIs include at least one of downlink block error rate, BLER, physical downlink control channel, PDCCH, control channel element, CCE, utilization, modulation sample percentage, uplink received signal strength indication, RSSI, downlink packet error loss, packet data convergence protocol traffic volume, data throughput, physical resource block, PRB, utilization, and network coverage percentage.

According to one or more embodiments of this aspect, the at least one action is configured to one of redistribute at least a portion of a traffic load, increase data throughput, improved quality of service for at least one wireless device, and redistribute at least a portion of communication power. According to one or more embodiments of this aspect, a victim cell of the plurality of cells is identified based at least in part on the at least one predicted network attribute meeting a predefined criterion where the at least one action is configured to reduce a probability that at least one network attribute that is predicted at a later time will meet the predefined criterion. According to one or more embodiments of this aspect, the predicted trend of values for each of the plurality of KPIs is based at least in part on a plurality of data streams associated with the plurality of cells.

According to one or more embodiments of this aspect, short-time Fourier Transform, STFT, coefficients are calculated based at least in part on the predicted trends of values for each of the plurality of KPIs where the at least one predicted network attribute is based at least in part on the calculated STFT coefficients. According to one or more embodiments of this aspect, the plurality of cells are logically clustered into a plurality of cell clusters based at least in part on at least one respective property of each plurality of cells. At least one respective property of a respective neighbor of each of the plurality of cells is logically weighed. A joint regression and classification framework is applied based at least on the logical cluster of the plurality of cells and the logical weighing of at least one respective property of the respective neighbor where the at least one action is based at least in part on the applied joint and classification framework. According to one or more embodiments of this aspect, a computer readable medium including instructions, which when executed by a processor, cause the processor to determine a plurality of key performance indicators, KPIs, for a plurality of cells in the communication network, predict a trend of values for each of the plurality of KPIs, the predicted trend of values indicating at least one predicted network attribute, and perform at least one action based at least in part on the at least one predicted network attribute.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
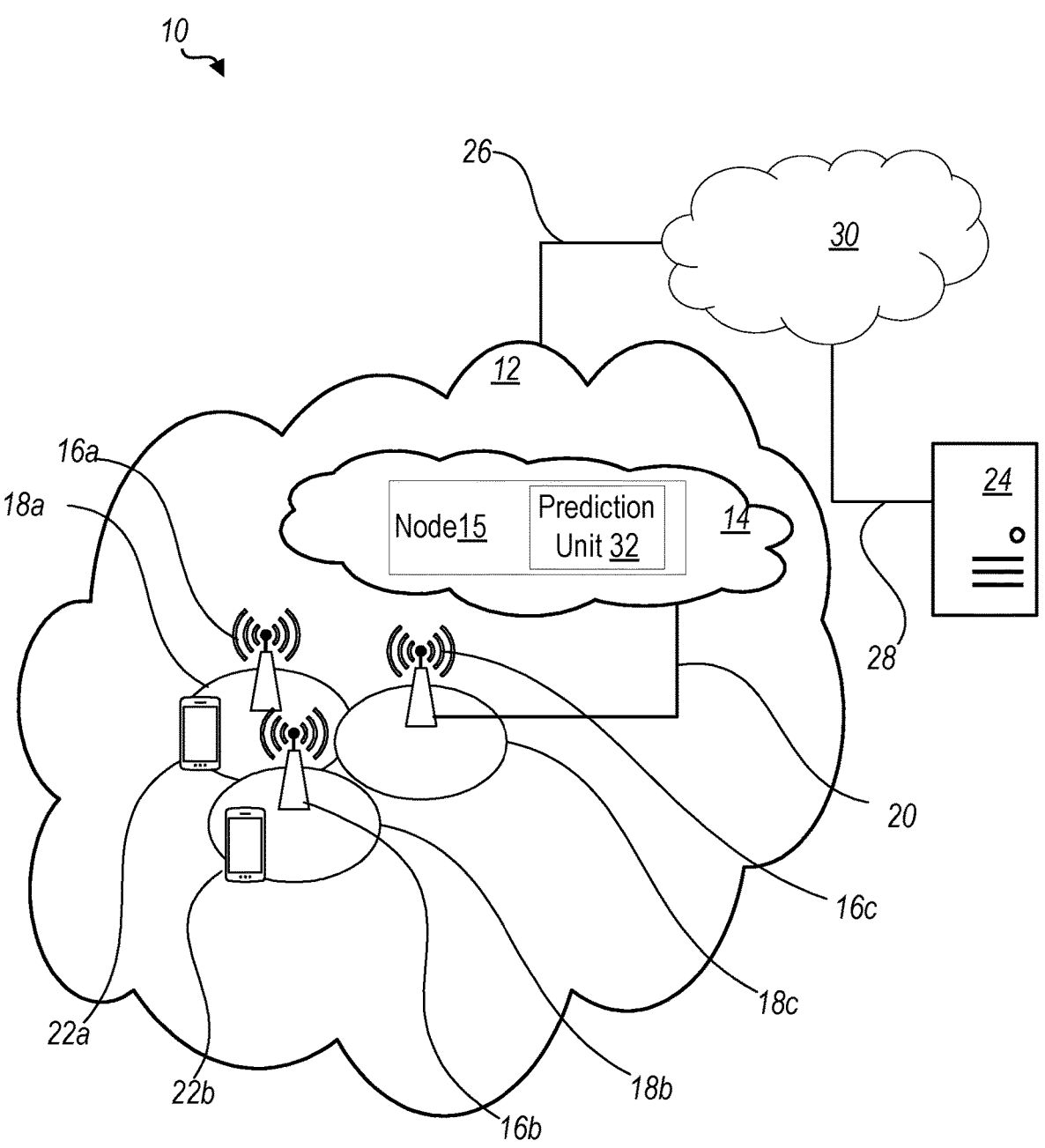
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to proactively predicting at least one network trend to trigger one or more actions. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IOT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

A cell may be generally a communication cell, e.g., of a cellular or mobile communication network, provided by a node. A serving cell may be a cell on or via which a network node (the node providing or associated to the cell, e.g., base station, gNB or eNodeB) transmits and/or may transmit data (which may be data other than broadcast data) to a user equipment, in particular control and/or user or payload data, and/or via or on which a user equipment transmits and/or may transmit data to the node; a serving cell may be a cell for or on which the user equipment is configured and/or to which it is synchronized and/or has performed an access procedure, e.g., a random access procedure, and/or in relation to which it is in a RRC_connected or RRC_idle state, e.g., in case the node and/or user equipment and/or network follow the LTE-standard. One or more carriers (e.g., uplink and/or downlink carrier/s and/or a carrier for both uplink and downlink) may be associated to a cell.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide proactively predicting at least one network trend to trigger one or more actions. In one or more embodiments, a "trend" may refer to general logical direction a predicted range of values are going such as, for example, the values are generally increasing or decreasing. In particular, "trend" may be defined as a function of time, i.e., KPI(t)=y(t)+e(t) where y(t) is linear or non-linear function and referred to as the "trend" and e(t) is the noise component. Some examples of how to calculate y(t) includes one or more of a moving average, lower bound, upper bound or median over a short-time interval of KPI(t).

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The core network may include one or more nodes 15. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A node 15 is configured to include a prediction unit 32 which is configured to perform one or more node 15 functions as described herein such as with respect to proactively predicting at least one network trend to trigger one or more actions.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to process, analyze, store, forward, relay, communicate, receive, etc., information related to proactively predicting at least one network trend to trigger one or more actions.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

In one or more embodiments, a node 15 provided in a communication system 10 and including hardware 94 enabling it to communicate with one or more of host computer 24, network node 16 and WD 22. The hardware 94 may include a communication interface 96 for setting up and maintaining a wired or wireless connection with an interface of a different communication device of the communication system 10. In one or more embodiments, communication interface 96 includes one or more RF transmitters, one or more RF receivers, and/or one or more RF transceivers. The communication interface 60 may be configured to facilitate a connection 66 to one or more of the host computer 24 and network node 16. The connection 66 may be direct or it may pass through a core network 14 of the communication system 10 and/or through one or more intermediate networks 30 outside the communication system 10.

In the embodiment shown, the hardware 94 of node 15 further includes processing circuitry 98. The processing circuitry 98 may include a processor 100 and a memory 102. In particular, in addition to or instead of a processor, such as a central processing unit, and memory, the processing circuitry 98 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 100 may be configured to access (e.g., write to and/or read from) the memory 102, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Memory 102 may include and/or correspond to a computer readable medium that includes instructions, which when executed by processor 100, cause processor 100 to perform one or more node 15 functions as described herein.

Thus, the network node 15 further has software 104 stored internally in, for example, memory 102, or stored in external memory (e.g., database, storage array, network storage device, etc.) accessible by the node 15 via an external connection. The software 104 may be executable by the processing circuitry 98. The processing circuitry 98 may be configured to control any of the methods and/or processes described herein and/or to cause such methods, and/or processes to be performed, e.g., by node 15. Processor 100 corresponds to one or more processors 100 for performing node 15 functions described herein. The memory 102 is configured to store data, programmatic software code and/or other information described herein. In some embodiments, the software 104 may include instructions that, when executed by the processor 100 and/or processing circuitry 98, causes the processor 100 and/or processing circuitry 98 to perform the processes described herein with respect to node 15. For example, processing circuitry 98 of the node 15 may include prediction unit 32 configured to perform one or more node 15 functions as described herein such as with respect to proactively predicting at least one network trend to trigger one or more actions.

Figure 2:
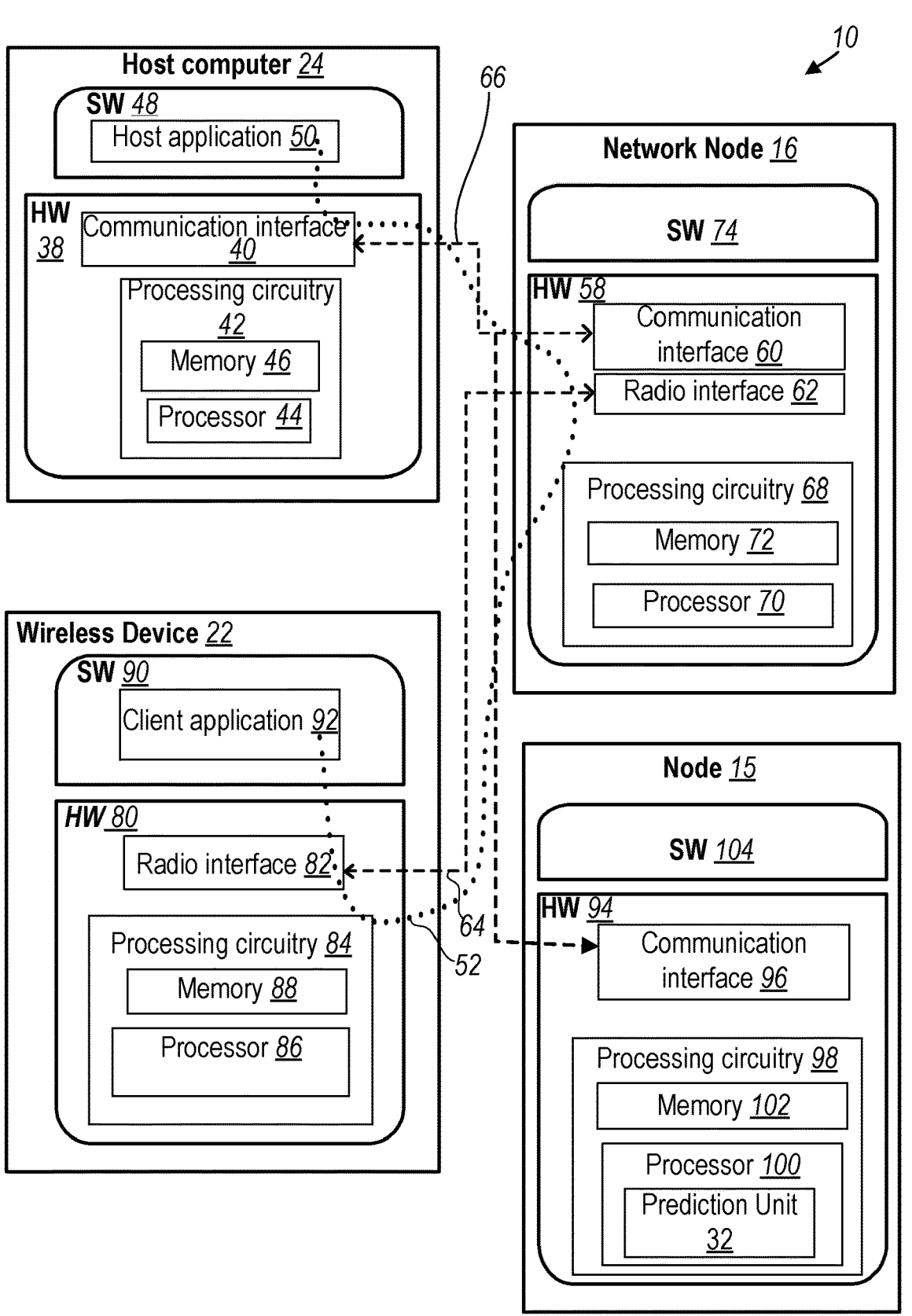
FIG. 2 is a block diagram of a host computer communicating via a network node with a wireless device over an at least partially wireless connection according to some embodiments of the present disclosure.

In some embodiments, the inner workings of the node 15, network node 16, WD 22, and host computer 24 may be as shown in FIG. 2 and independently, the surrounding network topology may be that of FIG. 1.

In FIG. 2, the OTT connection 52 has been drawn abstractly to illustrate the communication among the host computer 24, wireless device 22, network node 16, and node 15 without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22. In some embodiments, the node 15 is configured to, and/or the node's 15 processing circuitry 98 is configured to perform the functions and/or methods described herein.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16/node 15, and/or preparing/terminating/maintaining/supporting/ending in receipt of a transmission from the network node 16/node 15.

Although FIGS. 1 and 2 show "unit" such as prediction unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 3, 4:
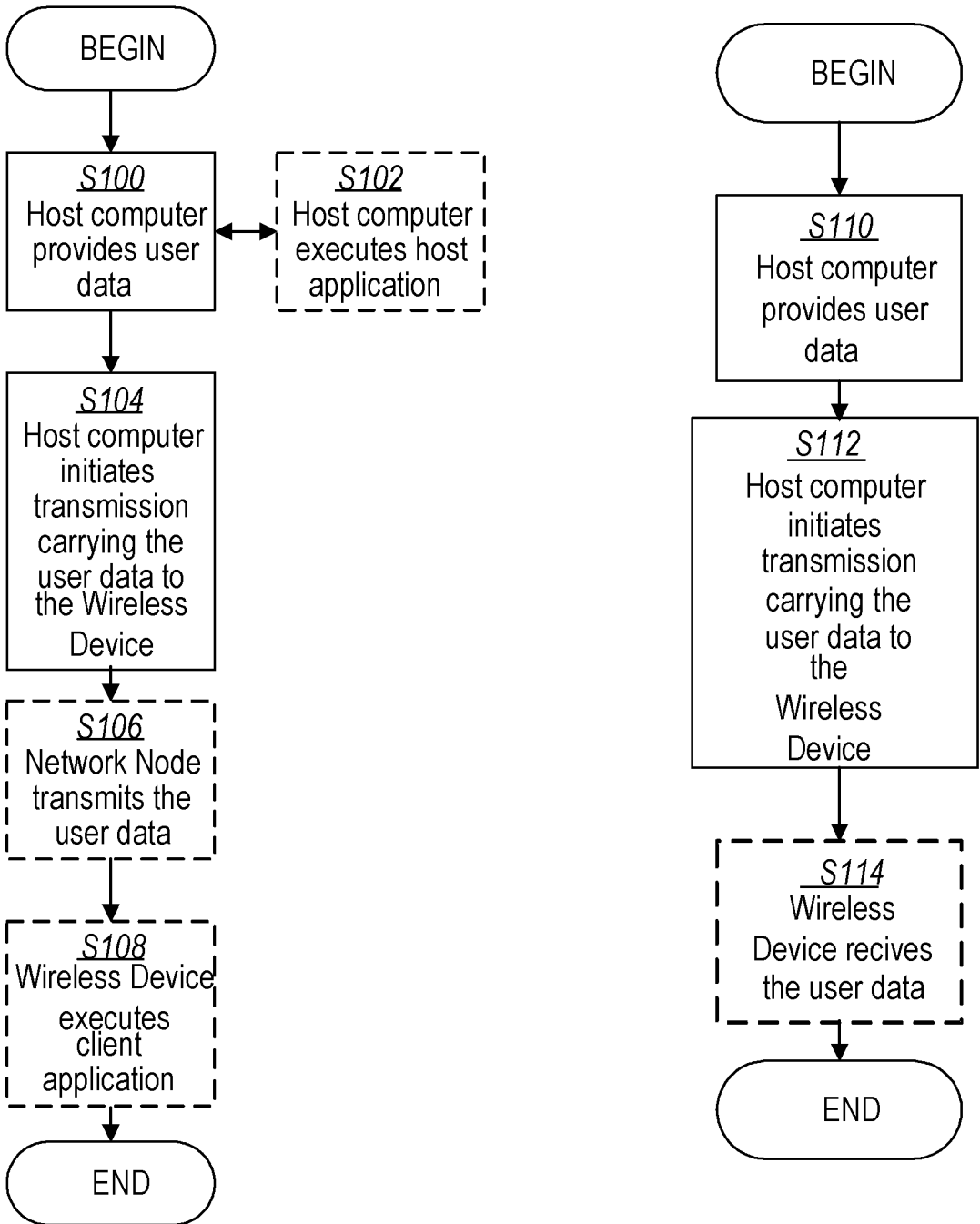
FIG. 3 is a flowchart illustrating example methods implemented in a communication system including a host computer, a network node and a wireless device for executing a client application at a wireless device according to some embodiments of the present disclosure.
FIG. 4 is a flowchart illustrating example methods implemented in a communication system including a host computer, a network node and a wireless device for receiving user data at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16, node 15 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an example method implemented in a communication system, such as, for example, the communication system of FIG. 1, in accordance with one embodiment. The communication system may include a host computer 24, a network node 16, node 15 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figure 5:
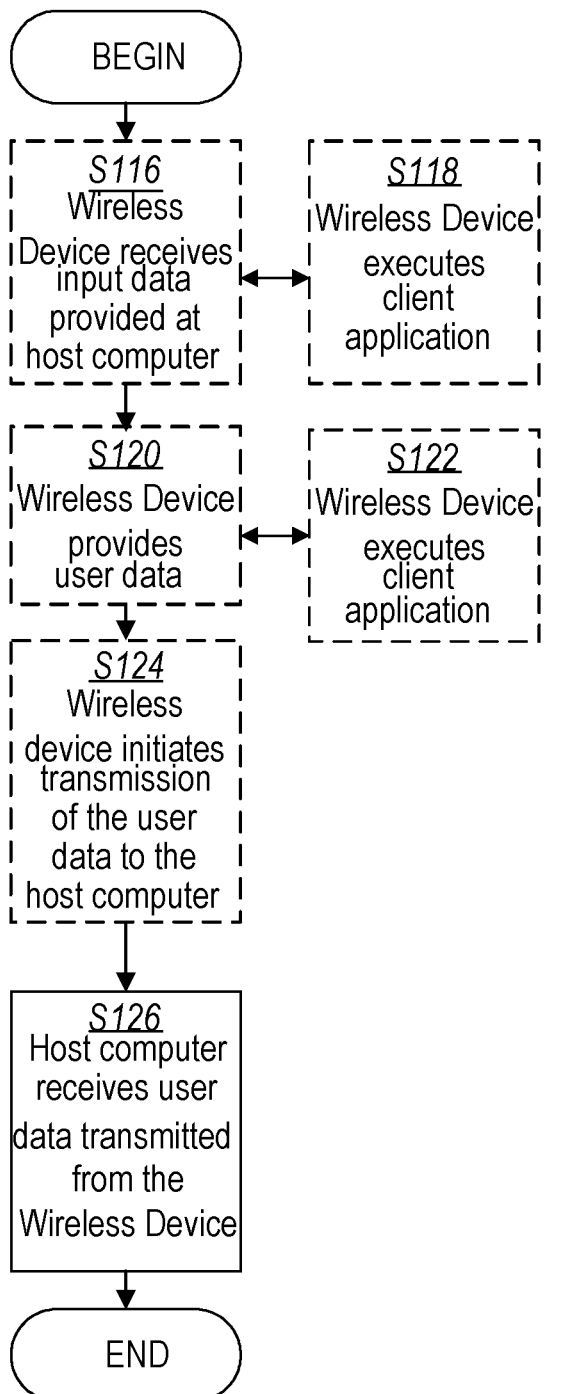
FIG. 5 is a flowchart illustrating example methods implemented in a communication system including a host computer, a network node and a wireless device for receiving user data from the wireless device at a host computer according to some embodiments of the present disclosure.

FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
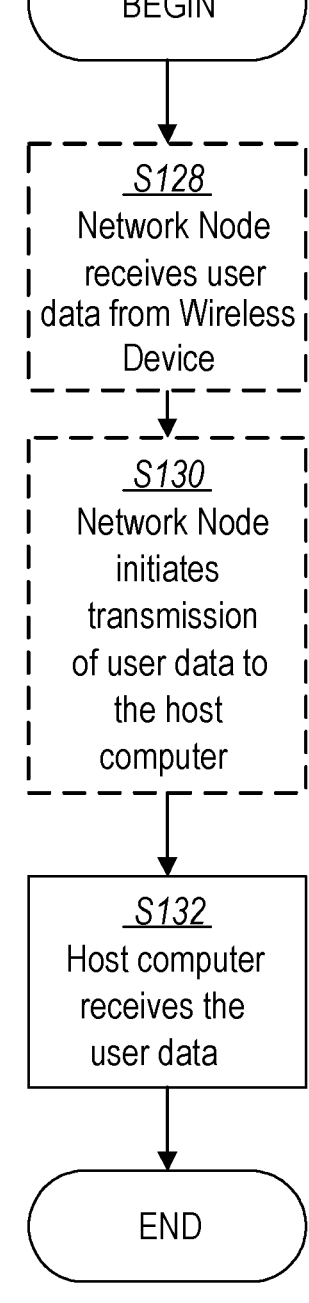
FIG. 6 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
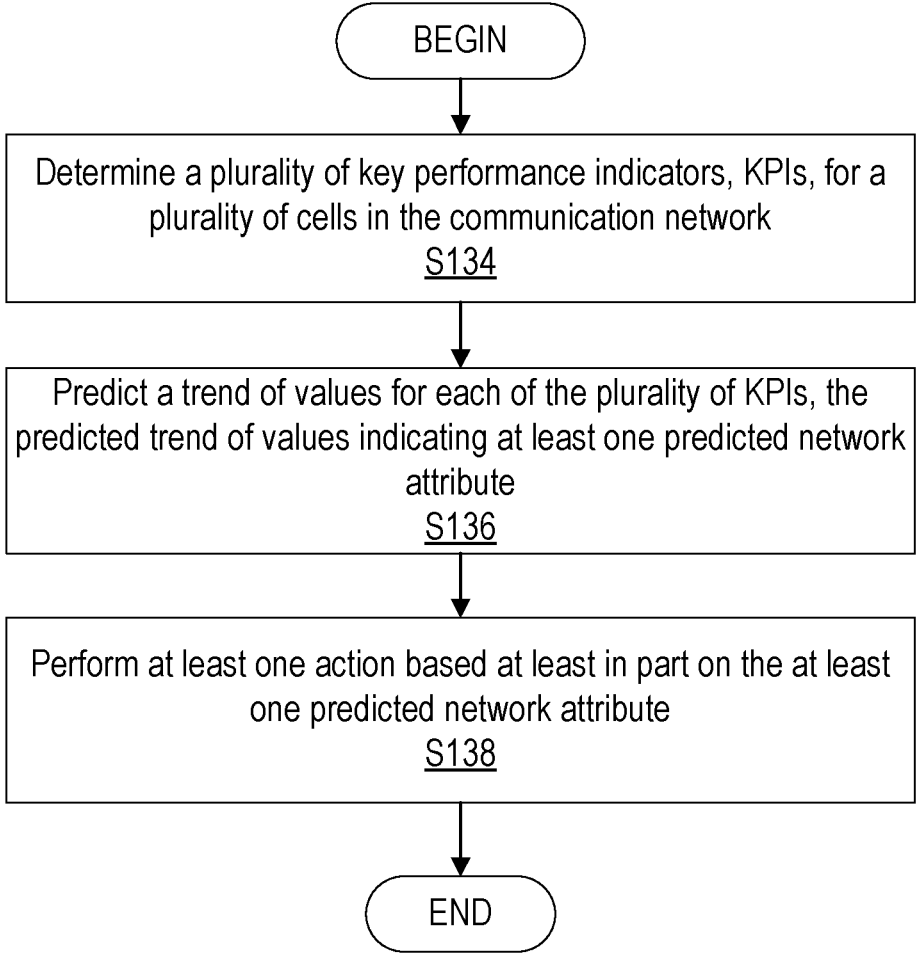
FIG. 7 is a flowchart of an example process in a node according to some embodiments of the present disclosure.

FIG. 7 is a flowchart of an example process in node 15 according to some embodiments of the present disclosure. In one or more embodiments, node 15 is a node in core network 14 providing the functionality described herein. Alternatively, the functionality of node 15 may be performed by one or more entities in communication system 10 such as by network node 16. One or more blocks and functions described herein may be performed by one or more elements of node 15 such as by one or more of processing circuitry 98 (including prediction unit 32), processor 100 and/or communication interface 96. Node 15 configured to determine (Block S134) a plurality of key performance indicators, KPIs, for a plurality of cells 18 in the communication network, as described herein. Node 15 is configured to predict (Block S136) a trend of values for each of the plurality of KPIs where the predicted trend of values indicates at least one predicted network attribute, as described herein. Node 15 is configured to perform (Block S138) at least one action based at least in part on the at least one predicted network attribute, as described herein.

According to one or more embodiments, the at least one action includes at least one of performing handover of at least one wireless device 22, changing a coverage area of a network node 16, changing in antenna tilt at the network node 16 and changing a communication power at a cell 18, as described herein. According to one or more embodiments, the predicted trend of values are predicted in advance by at least four reporting output periods, ROPs, for the plurality of cells 18, as described herein. According to one or more embodiments, the at least one predicted network attribute indicates at least one of cell accessibility and proactive network and energy utilization, as described herein.

According to one or more embodiments, the predicted trend of values for each KPI of the plurality of KPIs is based at least in part on at least one spatio-temporal characteristic that is derived from the respective one of the plurality of KPIs, as described herein. According to one or more embodiments, the at least one spatio-temporal characteristic includes at least one of historical data, periodicity and Fourier coefficients of the plurality of cells 18 and at least one neighbor cell 18, as described herein. According to one or more embodiments, the plurality of KPIs include at least one of: downlink block error rate, BLER; physical downlink control channel, PDCCH, control channel element, CCE, utilization; modulation sample percentage; uplink received signal strength indication, RSSI; downlink packet error loss; packet data convergence protocol traffic volume; data throughput; physical resource block, PRB, utilization; and network coverage percentage, as described herein.

According to one or more embodiments, the at least one action is configured to one of: redistribute at least a portion of a traffic load; increase data throughput; improved quality of service for at least one wireless device 22; and redistribute at least a portion of communication power, as described herein. According to one or more embodiments, the processing circuitry 98 is further configured to identify a victim cell 18 of the plurality of cells 18 based at least in part on the at least one predicted network attribute meeting a predefined criterion, as described herein. The at least one action is configured to reduce a probability that at least one network attribute that is predicted at a later time will meet the predefined criterion, as described herein. According to one or more embodiments, the predicted trend of values for each of the plurality of KPIs is based at least in part on a plurality of data streams associated with the plurality of cells 18, as described herein.

According to one or more embodiments, the processing circuitry 98 is further configured to calculate short-time Fourier Transform, STFT, coefficients based at least in part on the predicted trends of values for each of the plurality of KPIs, the at least one predicted network attribute being based at least in part on the calculated STFT coefficients, as described herein. According to one or more embodiments, the processing circuitry 98 is further configured to: logically cluster the plurality of cells into a plurality of cell clusters based at least in part on at least one respective property of each plurality of cells; logically weigh at least one respective property of a respective neighbor of each of the plurality of cells; and apply a joint regression and classification framework based at least on the logical cluster of the plurality of cells and the logical weighing of at least one respective property of the respective neighbor where the at least one action is based at least in part on the applied joint and classification framework, as described herein.

Having described the general process flow of arrangements of the disclosure and having provided examples of hardware and software arrangements for implementing the processes and functions of the disclosure, the sections below provide details and examples of arrangements for proactively predicting at least one network trend to trigger one or more actions such as network based actions.

Some embodiments provide for node 15 to proactively predict at least one network trend to trigger one or more actions.

One or more embodiments described herein provides a framework to proactively predict a network attribute such as cell performance in advance in order to help prevent, for example, traffic congestion and achieve load balance in cellular networks. The functionality described below such as with respect to proactively predicting at least one network trend to trigger one or more actions may be performed by node 15 such as by one or more of processing circuitry 98 (including prediction unit 32), processor 100 and/or communication interface 96.

Figure 8:
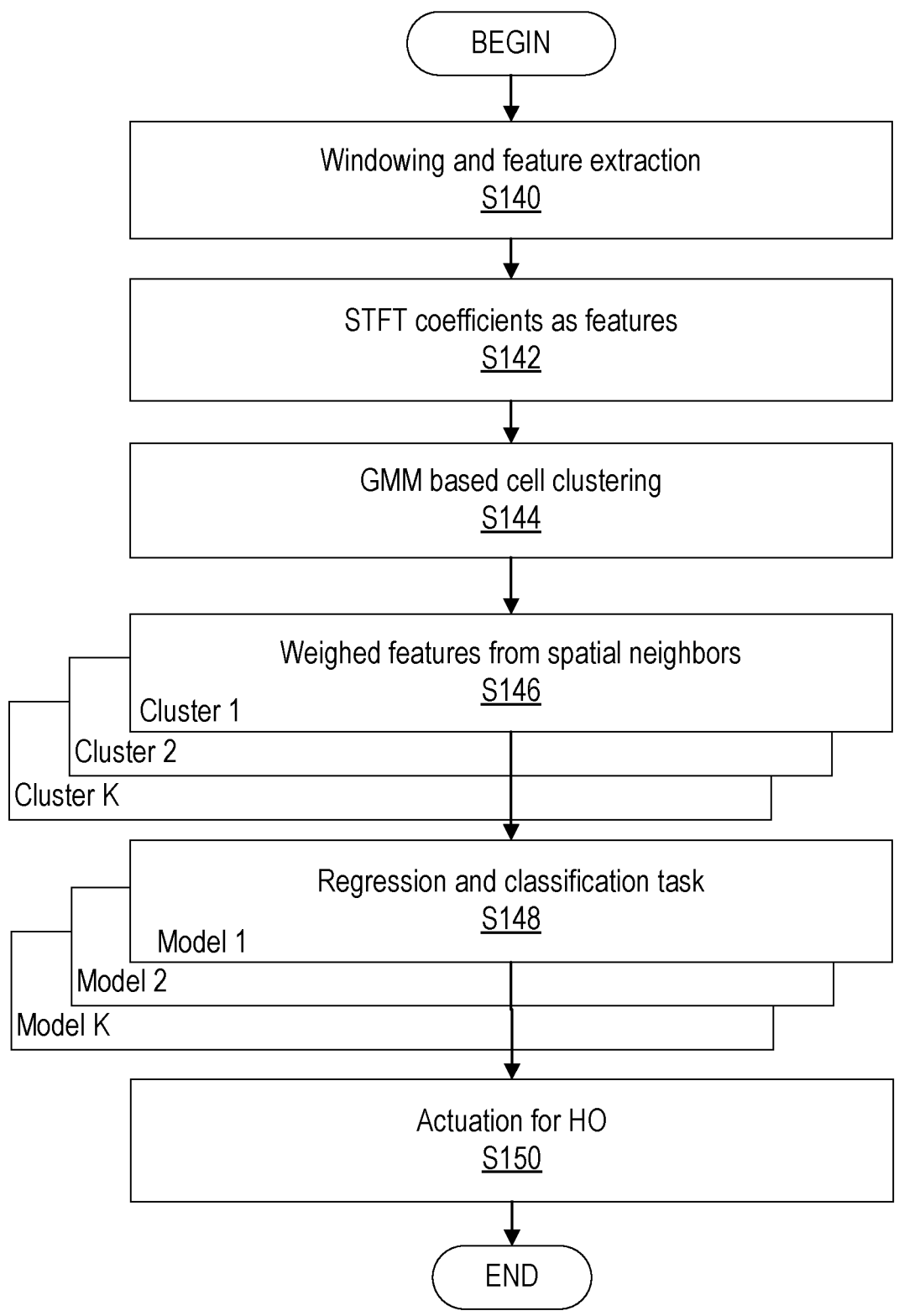
FIG. 8 is a block diagram for proactively predicting KPIs such as for traffic balancing according to some embodiments of the disclosure.

FIG. 8 is a block diagram for proactively predicting KPIs such as for traffic balancing according to some embodiments of the present disclosure. In particular, the functionality described with respect to FIG. 8 may be performed by node 15. Blocks S140 and S142 are indicative of the features considered feature extraction. Block S144 clusters cells with similar features into K-clusters. Features from spatial neighbors of each cell 18 are weighed as indicated in Block S146. The regressor and classifier is trained for each cluster as indicated in Block S148. Victim and target cells 18 are identified based on the output of regressor/classifier and the process for HO actuation is initiated as indicated in Block S150. Details of FIG. 8 are further described below.

Referred to FIG. 8, in order to proactively predict congested cells 18, the general process may be as follows: in the first stage, the KPIs which indicate congestion in cells 18 are predicted in advance by, for example, 4 reporting output periods (ROPs) for all the cells 18, as described below. In the next stage, a rule-based classification of the predicted values is used to identify victim cells 18 such that one or more actions may be performed to help prevent the predicted victim cell 18 from actually become a victim cell 18, as described below. One or more embodiments described herein provide one or more of the following advantages— since the prediction of congestion is isolated from the rule-based classification, the model does not require retraining if the rules for classification (i.e., predefined criterion/ criteria) into victim/non-victim cells change.

Figure 9:
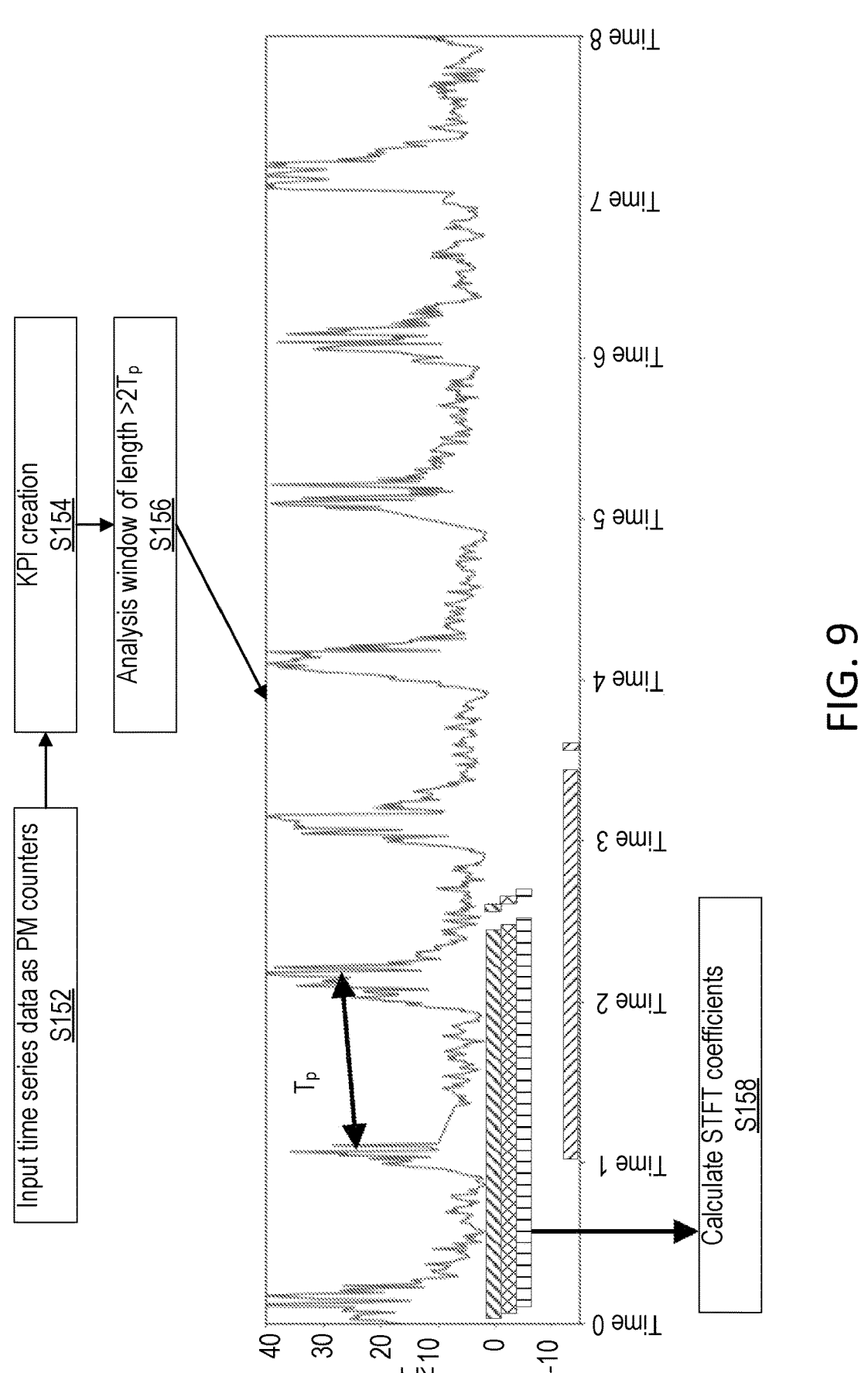
FIG. 9 is a diagram of feature extraction according to some embodiments of the present disclosure.

Owing to the strong presence of a temporal structure in the congestion indicative KPIs, a time-series based approach is considered. Consider any KPI of cell c to be indicated by $x^c[t]$, and the periodicity to be indicated by $T_p$. At any time instant $t_0$, a sliding window of length encompassing at least $2T_p$ historical data is considered, i.e., $x^c[t_0-2T_p: t_0]$ is considered (Block S140). An example of the sliding window is illustrated in FIG. 9. Let $X_{t0}{}^c$ indicate the STFT of this windowed data at time $t_0$. An ensemble of the STFT coefficients from various correlated KPIs forms the feature vector as determined by node 15 (Block S142). In order to ensure that cells with similar features are clustered together, the cells are clustered (i.e., logically clustered), by node 15, into K clusters using GMM (Block S144).

Additional features such as one or more of hour, weekdays, FDD_TDD_type, presence and absence of massive MIMO and DL Capacity may also be appended/included for better prediction results.

While one or more embodiments enlists STFT coefficients for the feature vector, the historical data resulting from aggregation of a smaller rolling window can also be used (Example 1).

For each of the cells 18, the spatial neighbors (i.e., neighbor cells 18) are considered by node 15. It is observed that there is significant correlation between the cell KPIs and that of its neighbors based on the process described below with respect to FIG. 10. This correlation with its neighbors is inculcated into the features by appending weighted features of the cells' spatial neighbors as follows:

$$F_t^C = \left[ X_t^C, \sum_{n=1}^{N_c} \beta_n X_t^n \right]$$

where $N_c$ is indicative of N neighbors of cell C. The weights, $\beta_n$ are inversely proportional to the rank of the neighbor, $r_n$ which is determined to be inversely proportional to proximity and availability of the resources. This spatial neighborhood feature is appended to the features of all cells 18.

Figure 10:
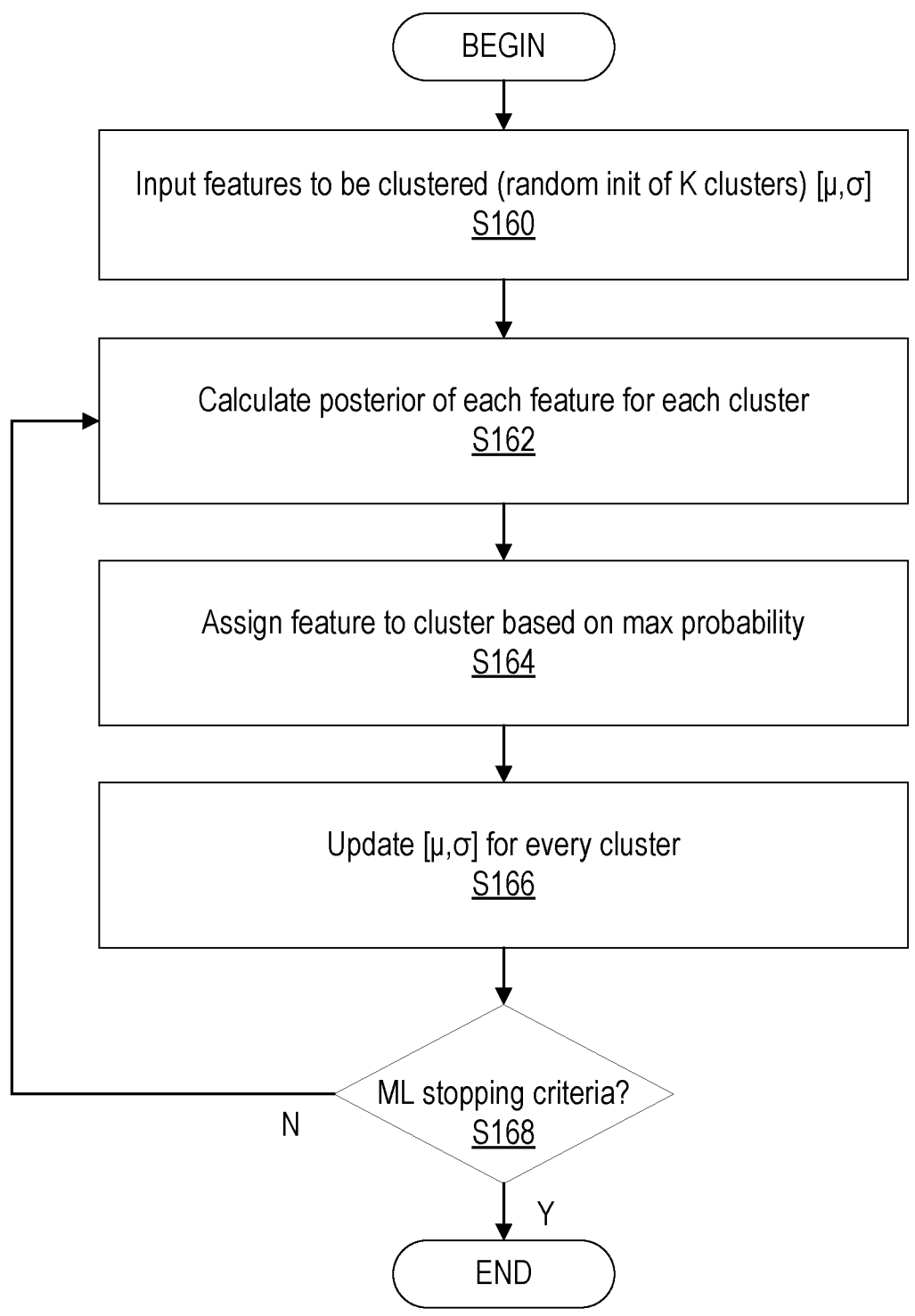
FIG. 10 is a diagram illustrating the use the ML based Gaussian Mixture model (GMM) cell clustering approach according to some embodiments of the present disclosure.

Referring back to FIG. 8, the spatio-temporal features are input by node 15 into a joint regressor-classifier LSTM architecture (Block S148). The regressor-classifier structure helps ensure that the outputs around the current decision boundaries are appropriately weighed through the joint cost function. The last layer of LSTM is separately trained with regression and classification target outputs, while the remaining layers of LSTM is shared. The joint cost function is as depicted in FIG. 10 as described below.

Referring back to FIG. 8, while one or more embodiments described herein enlists or use the LSTM in the regressor-classifier framework, any other generic regressor-classifier approach can be used in accordance with the principles described herein (Example 2).

At the inferencing stage, the regressor output is still valid even if the classification configuration rules change.

Once the victim cells 18 are identified by node 15, then the ranked neighbours are considered for actuation of HO, i.e., at least one action is performed (Block 150). Actuation for HO can be in accordance with conventional techniques such as modification of A3, A5 offsets.

FIG. 9 is a diagram of feature extraction according to some embodiments of the present disclosure. For example, the process of FIG. 9 may correspond to the functions of Blocks S140-S142 such that node 15 is performing Blocks S152-S156. The analysis features of an input data stream that includes pm counter data for every cell 18 are input by node 15 (Block S152). The KPIs are created from the input pm data stream (Block S154). The KPIs are observed to have a strong temporal structure. To capture the long and short-time dependencies into the features, short-time Fourier transform (STFT) coefficients are calculated from the sliding window (of length at least twice the local periodicity) (Block S156-S158). The STFT coefficients are extracted with a hop length of 1 ROP to help ensure no loss of data.

Figure 11:
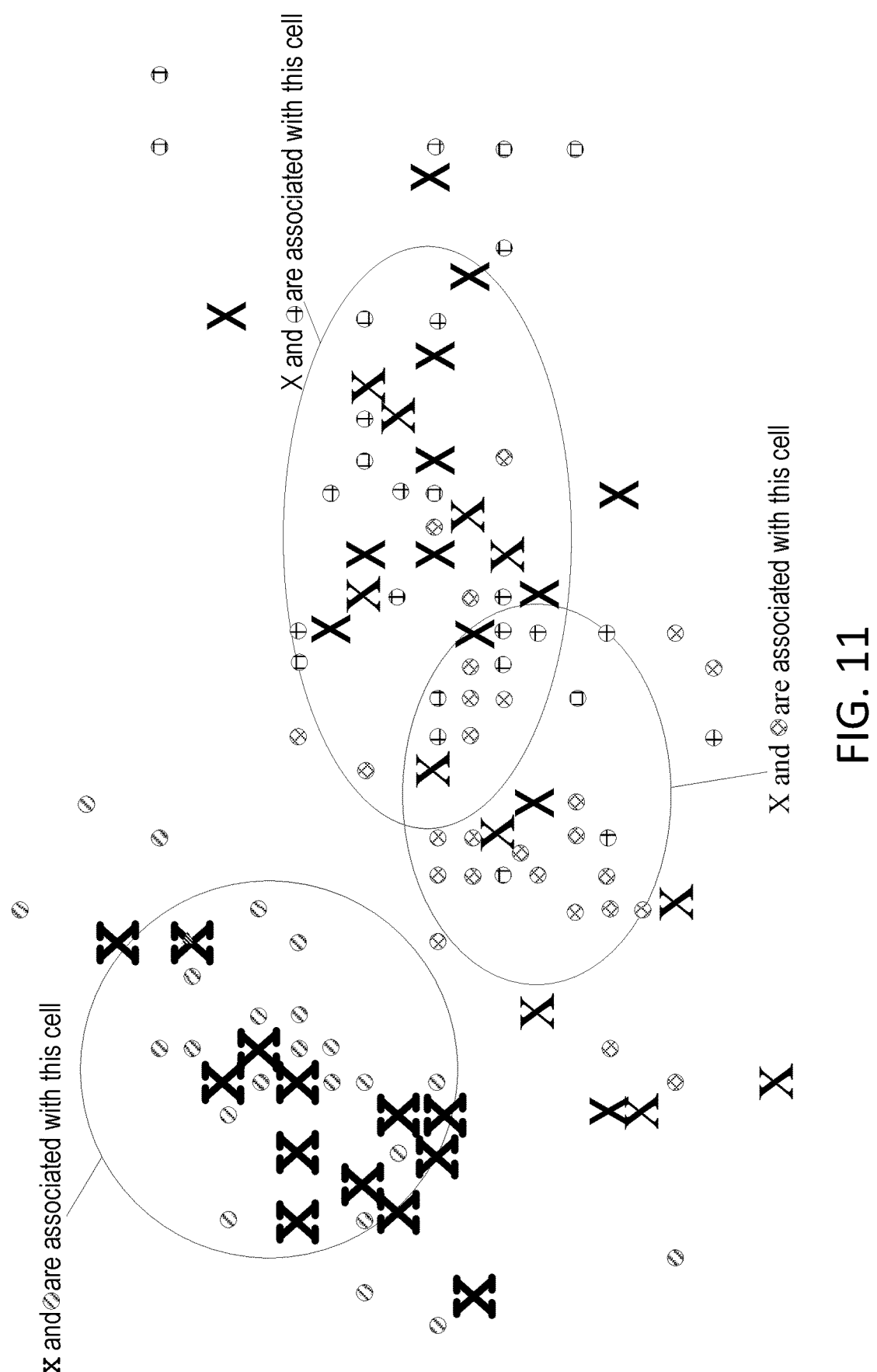
FIG. 11 is a diagram an example of the process of FIG. 10 after the ML stopping criteria is met according to some embodiments of the present disclosure.

FIG. 10 is a diagram illustrating the use the ML based Gaussian Mixture model (GMM) cell clustering approach according to some embodiments of the present disclosure. For example, the process of FIG. 10 may correspond to GMM based cell clustering of Block S144. The algorithm implemented by node 15 involves initializing the cluster centroids randomly, i.e., input features to be clustered (random init of K clusters [μ, σ]) (Block S160). Node 15 is configured to calculate the posterior of each feature for each cluster (Block S162). Node 15 is configured to assign the rest of the data points to the clusters based on the maximum of the posterior of each feature, i.e., a feature is assigned to the cluster based on the max probability (Block S164). Node 15 is configured to recalculate the centroids and variance of the clusters for each cluster, i.e., node 15 updates [μ,σ] for every cluster (Block S166). The steps of assigning and re-estimation constitute one iteration. The iterations are repeated till ML stopping criteria is satisfied or met (Block S168). FIG. 11 is a diagram of an example of the process of FIG. 10 after the ML stopping criteria is met, according to some embodiments of the present disclosure.

Table 1 illustrates the correlation between the features of a sample set of cells 18 and their two top neighbor cells 18.

TABLE 1

| Cell | Neighbor 1 | Neighbor 2 |
|------|-----------|-----------|
| Cell 1 | 0.5636 | 0.6527 |
| Cell 2 | 0.5521 | 0.7951 |
| Cell 3 | 0.6552 | 0.4324 |

The correlation values in Table 1 may vary from the range of −1 to 1.

Figure 12:
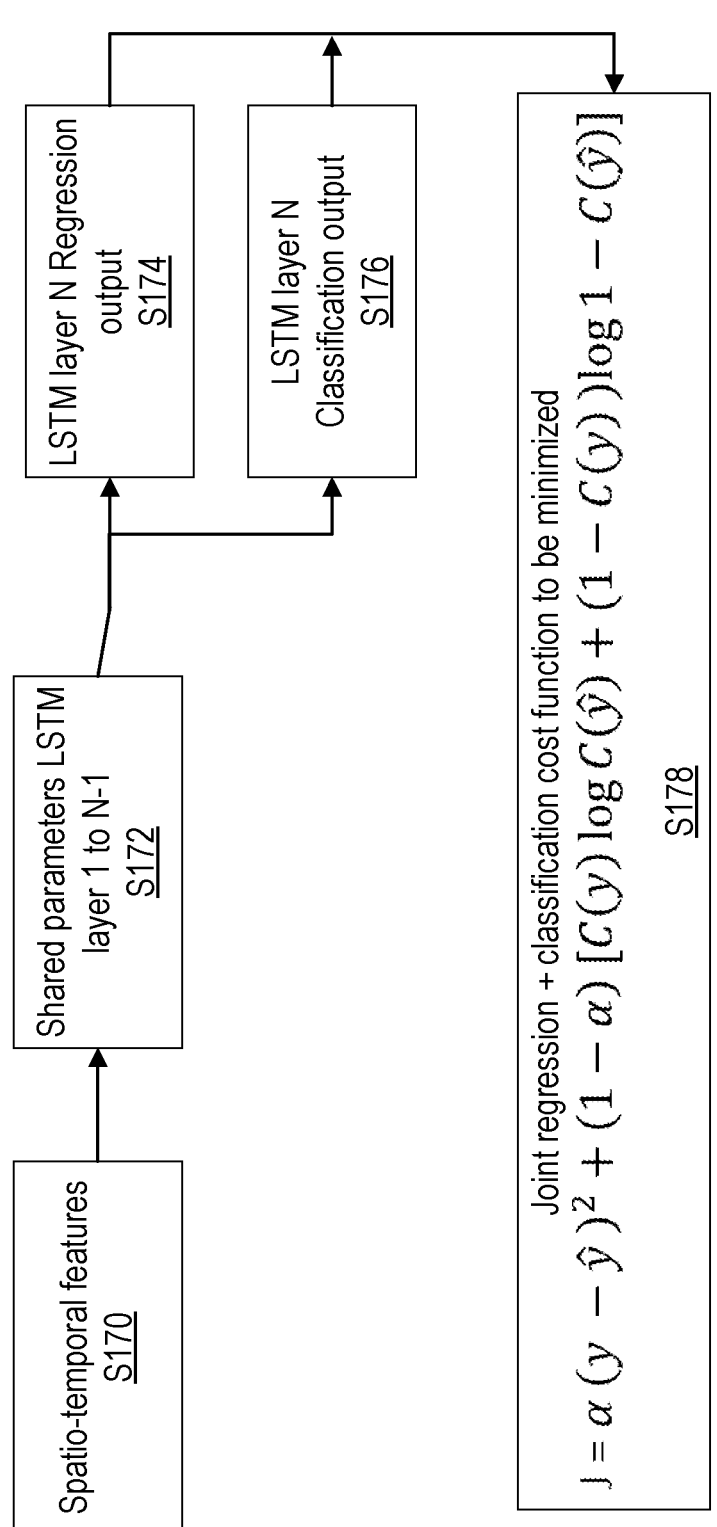
FIG. 12 is a flow diagram of a regression classification architecture according to some embodiments of the present disclosure.

FIG. 12 is a flow diagram of a regression classification architecture in accordance with some embodiments of the present disclosure. For example, the process of FIG. 12 may correspond to the regression and classification task of Block S148 where the process of FIG. 12 is performed by node 15. The spatio-temporal features obtained are input to the regressor/classifier framework (Block S170). A sample depiction is shown with LSTM architecture. Of the N layers of the deep network, the architecture is structured in shares parameters LSTM from 1 to N−1 layers (Block S172). The final layer branches off with one part used for regression (i.e., LSTM layer N regression output) (Block S174) and other for classification (LSTM layer N classification output) (Block S176). The joint cost function (Block S178) used for learning the weights of the network is shown through the feedback loop, i.e., Joint regression+classification cost function to be minimized $$J=\alpha(y-\hat{y})^2+(1-\alpha)[C(y)\log C(\hat{y})+(1-C(y))\log 1-C(\hat{y})].$$

Therefore, one or more embodiments described herein provide a ML based methodology to predict KPIs that are indicative of traffic in cells, in advance (at least N ROPs in advance). A network configuration rule, set based on network conditions, can be used to identify victim cells 18. For example, the network congestion rule may correspond to a predefined criterion where a predicted network attribute or predicted network condition meets or does not meet the predefined criterion. In one or more embodiments, the network configuration rule/predefined criterion can be configured or modified such as by a network operator without having to change the model. The load from affected cells 18 can be handed over to neighboring cells 18 for effective utilization of resources.

Spatio-temporal features are identified to capture temporal as well as spatial dependencies in the network. The cells are in turn clustered based on the similarity of these features using ML based GMM. ML models are built for each of the cluster while bringing in sensitivity around regions where network thresholds can be applied through a joint regressor-classifier framework for effective prediction.

One or more embodiments described herein are agnostic to addition or deletion or modification of bandwidths and/or cells which may occur in dynamic network scenarios. HO changes are dependent only on predicted KPI and no other optimization criteria, thus decreasing the time required for actuation of HO. This characteristic helps make the one or more embodiments described herein viable for real-time deployment.

One or more embodiments described herein are not limited for traffic balancing use case, and can be extended to other use cases by changing input features and target variables. Some example of other uses cases include one or more of: proactive network and energy optimization, RAN KPI degradation (e.g., latency degradation, throughput degradation, cell accessibility) and prediction (e.g., cell drop call rate, VOLTE CSSR (Call Setup Success Rate), packet loss rate).

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® C++ or Python™. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| HO | Handover |
| KPI | Key Performance Indicators |
| PRB | Physical Radio Bearer |
| Qos | Quality of Service |
| RAN | Radio Access Networks |
| ROP | Reporting Output Period |
| UE | User Equipment |
| ULRSSI | Uplink Received Signal Strength Indicator |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A node for a communication network, comprising:
processing circuitry configured to:
determine a plurality of key performance indicators, KPIs, for a plurality of cells in the communication network;
predict a trend of values for each of the plurality of KPIs, the predicted trend of values indicating at least one predicted network attribute;
identify a victim cell of the plurality of cells based at least in part on the at least one predicted network attribute meeting a predefined criterion; and
perform at least one action based at least in part on the at least one predicted network attribute, the at least one action being configured to reduce a probability that at least one network attribute that is predicted at a later time will meet the predefined criterion.

2. The node of claim 1, wherein the at least one action includes at least one of performing handover of at least one wireless device, changing a coverage area of a network node, changing in antenna tilt at the network node and changing a communication power at a cell.

3. The node of claim 1, wherein the predicted trend of values are predicted in advance by at least four reporting output periods, ROPs, for the plurality of cells.

4. The node of claim 1, wherein the at least one predicted network attribute indicates at least one of cell accessibility and proactive network and energy utilization.

5. The node of claim 1, wherein the predicted trend of values for each KPI of the plurality of KPIs is based at least in part on at least one spatio-temporal characteristic that is derived from the respective one of the plurality of KPIs.

6. The node of claim 5, wherein the at least one spatio-temporal characteristic includes at least one of historical data, periodicity and Fourier coefficients of the plurality of cells and at least one neighbor cell.

7. The node of claim 1, wherein the plurality of KPIs include at least one of:
downlink block error rate, BLER;
physical downlink control channel, PDCCH, control channel element, CCE, utilization;
modulation sample percentage;
uplink received signal strength indication, RSSI;
downlink packet error loss;
packet data convergence protocol traffic volume;
data throughput;
physical resource block, PRB, utilization; and
network coverage percentage.

8. The node of claim 1, wherein the at least one action is configured to one of:
redistribute at least a portion of a traffic load;
increase data throughput;
improved quality of service for at least one wireless device; and
redistribute at least a portion of communication power.

9. The node of claim 1, wherein the predicted trend of values for each of the plurality of KPIs is based at least in part on a plurality of data streams associated with the plurality of cells.

10. The node of claim 9, wherein the processing circuitry is further configured to calculate short-time Fourier Transform, STFT, coefficients based at least in part on the predicted trends of values for each of the plurality of KPIs, the at least one predicted network attribute being based at least in part on the calculated STFT coefficients.

11. The node of claim 1, wherein the processing circuitry is further configured to:
logically cluster the plurality of cells into a plurality of cell clusters based at least in part on at least one respective property of each plurality of cells;
logically weigh at least one respective property of a respective neighbor of each of the plurality of cells; and
apply a joint regression and classification framework based at least on the logical cluster of the plurality of cells and the logical weighing of at least one respective property of the respective neighbor, the at least one action being based at least in part on the applied joint and classification framework.

12. A method implemented by a node for a communication network, the method comprising:
determining a plurality of key performance indicators, KPIs, for a plurality of cells in the communication network;
predicting a trend of values for each of the plurality of KPIs, the predicted trend of values indicating at least one predicted network attribute;
identifying a victim cell of the plurality of cells based at least in part on the at least one predicted network attribute meeting a predefined criterion; and
performing at least one action based at least in part on the at least one predicted network attribute, the at least one action being configured to reduce a probability that at least one network attribute that is predicted at a later time will meet the predefined criterion.

13. The method of claim 12, wherein the at least one action includes at least one of performing handover of at least one wireless device, changing a coverage area of a network node, changing in antenna tilt at the network node and changing a communication power at a cell.

14. The method of claim 12, wherein the predicted trend of values are predicted in advance by at least four reporting output periods, ROPs, for the plurality of cells.

15. The method of claim 12, wherein the at least one predicted network attribute indicates at least one of cell accessibility and proactive network and energy utilization.

16. The method of claim 12, wherein the predicted trend of values for each KPI of the plurality of KPIs is based at least in part on at least one spatio-temporal characteristic that is derived from the respective one of the plurality of KPIs.

17. The method of claim 16, wherein the at least one spatio-temporal characteristic includes at least one of historical data, periodicity and Fourier coefficients of the plurality of cells and at least one neighbor cell.

18. The method of claim 12, wherein the plurality of KPIs include at least one of:
downlink block error rate, BLER;
physical downlink control channel, PDCCH, control channel element, CCE, utilization;
modulation sample percentage;
uplink received signal strength indication, RSSI;
downlink packet error loss;
packet data convergence protocol traffic volume;
data throughput;
physical resource block, PRB, utilization; and
network coverage percentage.

19. The method of claim 12, wherein the at least one action is configured to one of:
redistribute at least a portion of a traffic load;
increase data throughput;

improved quality of service for at least one wireless device; and redistribute at least a portion of communication power.

20. The method of claim 12, wherein the predicted trend of values for each of the plurality of KPIs is based at least in part on a plurality of data streams associated with the plurality of cells.

21. The method of claim 20, further comprising calculating short-time Fourier Transform, STFT, coefficients based at least in part on the predicted trends of values for each of the plurality of KPIs, the at least one predicted network attribute being based at least in part on the calculated STFT coefficients.

22. The method of claim 12, further comprising:

logically clustering the plurality of cells into a plurality of cell clusters based at least in part on at least one respective property of each plurality of cells;

logically weighing at least one respective property of a respective neighbor of each of the plurality of cells; and applying a joint regression and classification framework based at least on the logical cluster of the plurality of cells and the logical weighing of at least one respective property of the respective neighbor, the at least one action being based at least in part on the applied joint and classification framework.

23. A computer readable medium including instructions, which when executed by a processor, cause the processor to:

determine a plurality of key performance indicators, KPIs, for a plurality of cells in a communication network;

predict a trend of values for each of the plurality of KPIs, the predicted trend of values indicating at least one predicted network attribute;

identify a victim cell of the plurality of cells based at least in part on the at least one predicted network attribute meeting a predefined criterion; and perform at least one action based at least in part on the at least one predicted network attribute, the at least one action being configured to reduce a probability that at least one network attribute that is predicted at a later time will meet the predefined criterion.

* * * * *